United States Patent [19]

Mercy

[11] Patent Number: 5,365,469
[45] Date of Patent: Nov. 15, 1994

[54] FAST FOURIER TRANSFORM USING BALANCED COEFFICIENTS

[75] Inventor: Brian R. Mercy, Warrenton, Va.

[73] Assignee: International Business Machines Corporation, Armonk, N.Y.

[21] Appl. No.: 4,217

[22] Filed: Jan. 13, 1993

Related U.S. Application Data

[63] Continuation of Ser. No. 606,635, Oct. 31, 1990, abandoned.

[51] Int. Cl.$^5$ .............................................. G06F 7/38
[52] U.S. Cl. ...................................................... 364/726
[58] Field of Search .................................. 364/725, 726

[56] References Cited

U.S. PATENT DOCUMENTS

| | | | |
|---|---|---|---|
| 3,584,781 | 6/1971 | Edson | 364/726 |
| 3,584,782 | 6/1971 | Bergland | 364/726 |
| 3,777,131 | 12/1973 | Llewellyn | 364/726 |

OTHER PUBLICATIONS

Tran Thong, "FFT with Reduced Coefficient Storage Requirement", IEEE Symposium on Circuit and System, vol. 2/4, pp. 1537–1540, 1990.

Tokoro et al., "Fast Fourier Transform by Hardware", Systems & Computers & Controls, vol. 58-D, No. 9, pp. 578–585, 1975.

Gentlemen et al., "Fast Fourier Transform—for Fun and Profit", Proceeding-Fall Joint Computer Conference, pp. 563–578, 1966.

Primary Examiner—Long T. Nguyen
Assistant Examiner—Chuong D. Ngo
Attorney, Agent, or Firm—Mark A. Wurm; Joseph C. Redmond, Jr.

[57] ABSTRACT

A method and apparatus for processing a digital signal by a fast Fourier transformation using balanced coefficients. The balanced coefficient method reduces the number of coefficients required to process an FFT of size $2^p$ from a total of $2^p$ coefficients to p times the square root of $2^p$. The new system employs a reduced number of coefficients in a unique addressing scheme to produce a cheaper, lighter, smaller, cooler FFT processor which uses less power and is more reliable.

7 Claims, 3 Drawing Sheets

| STAGE | COEFFICIENT ADDRESS |
|---|---|
| 1 | LOW ORDER 12 BITS |
| 2 | LOW ORDER 10 BITS |
| 3 | LOW ORDER 8 BITS |
| 4 | LOW ORDER 6 BITS |
| 5 | LOW ORDER 4 BITS |
| 6 | LOW ORDER 2 BITS |

| STAGE | COEFFICIENT ADDRESS |
|---|---|
| 1 | LOW ORDER 8 BITS |
| 2 | LOW ORDER 8 BITS |
| 3 | LOW ORDER 8 BITS |
| 4 | BITS (2,8,9...,15) |
| 5 | BITS (1,2,8,9...,15) |
| 6 | LOW ORDER 2 BITS |

FIG. 3

$$S\left(\frac{1}{16}ac + \frac{1}{64}bc\right)$$
$$S\left(\frac{1}{16}ac + \frac{1}{256}ab\right)$$
} 256 POINT FFT ($4^4$)

$$S\left(\frac{1}{16}ad + \frac{1}{64}bd + \frac{1}{256}cd\right)$$
$$S\left(\frac{1}{16}ac + \frac{1}{1024}ab\right)$$
} 1K POINT FFT ($4^5$)

$$S\left(\frac{1}{16}ad + \frac{1}{64}bd + \frac{1}{256}cd\right)$$
$$S\left(\frac{1}{16}ad + \frac{1}{64}bd + \frac{1}{1024}ac\right)$$
$$S\left(\frac{1}{16}ad + \frac{1}{1024}ab + \frac{1}{4096}ac\right)$$
} 4K POINT FFT ($4^6$)

$$S\left(\frac{1}{16}ae + \frac{1}{64}be + \frac{1}{256}ce + \frac{1}{1024}de\right)$$
$$S\left(\frac{1}{16}ad + \frac{1}{64}bd + \frac{1}{4096}ac\right)$$
$$S\left(\frac{1}{16}ad + \frac{1}{4096}ab + \frac{1}{16,384}ac\right)$$
} 16K POINT FFT ($4^7$)

$$S\left(\frac{1}{16}ae + \frac{1}{64}be + \frac{1}{256}ce + \frac{1}{1024}de\right)$$
$$S\left(\frac{1}{16}ae + \frac{1}{64}be + \frac{1}{256}ce + \frac{1}{4096}ad\right)$$
$$S\left(\frac{1}{16}ae + \frac{1}{64}ab + \frac{1}{4096}ac + \frac{1}{16,384}ad\right)$$
$$S\left(\frac{1}{16}ae + \frac{1}{4096}ab + \frac{1}{16,384}ac + \frac{1}{65,536}ad\right)$$
} 64K FFT ($4^8$)

FAST FOURIER TRANSFORM USING BALANCED COEFFICIENTS

This invention was made with Government support under contract number DAAB10-87-C-0030 awarded by the Department of Army. The Government has certain rights in this invention.

This application is a continuation of application Ser. No. 07/606,635, filed Oct. 31, 1990, now abandoned.

BACKGROUND OF THE INVENTION

1. Field of the Invention

The present invention relates to digital data processing systems and in particular, to a processing means and method for performing fast Fourier transforms using balanced coefficients.

2. Description of the Prior Art

The Fourier transform operation is well-known and a discrete Fourier transform algorithm by Berglund and a fast Fourier transform algorithm by Cooley and Tukey are discussed at length in a book entitled *The Fast Fourier Transform and Its Applications* by E. Brigham, 1988 by Prentice-Hall. The fast Fourier transform (FFT) is a widely used signal processing and analysis concept. Availability of special purpose hardware in both the commercial and military sectors has led to sophisticated signal processing systems based on the features of FFT. Additionally, implementation of FFT algorithms can be done on large mainframe computers or on the ubiquitous personal computers. The minimum apparatus for performing a fast Fourier transform comprises a processor, a random access memory, a program stored in read only memory, memory addressing means and a communal data bus.

The discrete Fourier transform, and its derivation, the fast Fourier transform (FFT), predict that a continuous waveform can be represented in the frequency domain and in the time domain by the sums of complex series of terms, both of which involve a set of Fourier coefficients. It is in the nature of the transform process that calculations of all frequency components, from zero frequency upwards, must be performed in every transformation. The computational power required to transform from the time domain to the frequency domain is enormous. The computational power needed requires a lot of memory and uses a lot of electrical energy with its accompanying heating effects. This makes FFT processors large, heavy and expensive.

All available literature indicates that for an FFT of size $2^p$ a total of $2^p$ coefficients are required. Providing the memory storage for this many coefficients increases the FFT product cost, size, weight and power.

OBJECTS OF THE INVENTION

It is an object of the invention to reduce the number of coefficients required to perform a fast Fourier transform.

It is a further object of the invention to reduce the product cost, size, weight and power requirements for apparatus to perform fast Fourier transforms.

SUMMARY OF THE INVENTION

The invention is a process and apparatus for performing a FFT using a reduced number of constant coefficients to achieve the same transformational result. The invention reduces the number of coefficients required to perform an FFT of size $2^p$ to p times the square root of $2^p$. It was found that by rearranging the coefficients and the terms of the fast Fourier transform algorithm in a manner to balance the number of coefficients being calculated, the number of coefficients required can be greatly reduced. The FFT processor using this method is smaller, lighter, cheaper and uses less power.

BRIEF DESCRIPTION OF THE DRAWINGS

The invention and how it may be carried out into practice will now be described by way of example with reference to the accompanying drawings.

FIG. 3 is a table showing the generalized balanced coefficient equations for various sized FFTs.

DESCRIPTION OF THE INVENTION

Figures 1A, 1B:
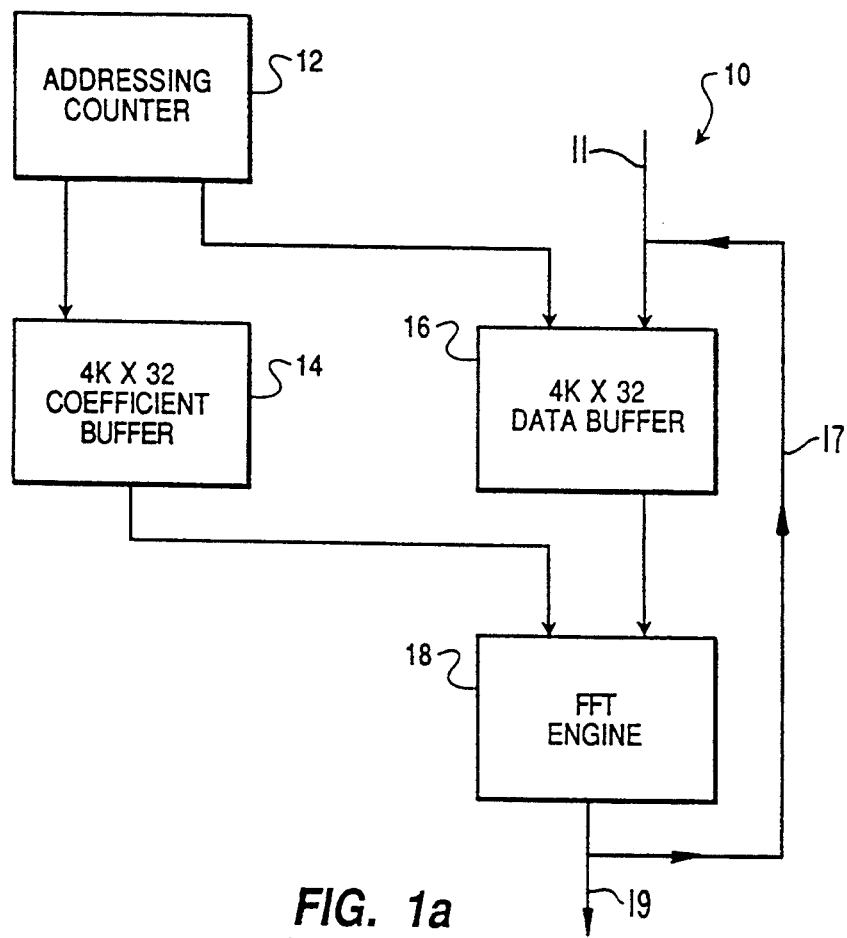
FIG. 1A shows in block form, an apparatus for performing a 4096 point FFT using Sande-Tukey coefficients.
FIG. 1B is a chart showing the coefficient addressing scheme of the apparatus of FIG. 1A.

Conventional calculation of an N point Fast Fourier Transform (FFT) requires N stored coefficients. What follows will show that is is possible to calculate an FFT using a concept called *balanced* coefficients, greatly reducing required coefficient storage. For example, applying the new concept of a 256 point FFT reduces coefficient storage by a factor of 2, from 256 to 128, a 4K point FFT by a factor of more than 5, from 4K to 768, and a 64K point FFT by a factor of 16, from 64K to 4K.

The *balanced* coefficient concept is now demonstrated for the 4K point FFT using the Sande-Tukey algorithm:

$$x_i(n_0, \ldots, n_{i-1}, k_{m-i-1}, \ldots, k_0) =$$

$$\left[ \sum_{k_{m-i}} x_{i-1}(n_0, \ldots, n_{i-2}, k_{m-i}, \ldots, k_0) W^{n_{i-1}k_{m-i}(N/r_i)} \right] \times$$

$$W^{n_{i-1}(k_{m-i-1}(r_i+2\ldots r_m)+\ldots+k_1 r_m+k_0)(r_1 r_2 \ldots r_{i-1})}.$$

This equation assumes that the number of points to be transformed is composite, i.e. $N = r_1 r_2 r_3 \ldots r_m$ where $r_1, r_2, r_3, \ldots, r_m$ are integers. For the present example, it is assumed that $r_1 = r_2 = r_3 = \ldots = r_m = 4$, i.e. the radix is 4. The indices, n and k, are expressed by these equations:

$$n = n_{m-1}(r_1 r_2 r_3 \ldots r_{m-1}) + n_{m-2}(r_1 r_2 r_3 \ldots r_{m-2}) + \ldots + n_1 r_1 + n_0,$$

$$k = k_{m-1}(r_2 r_3 r_4 \ldots r_m) + k_{m-2}(r_3 r_4 r_5 \ldots r_m) + \ldots + k_1 r_m + k_0,$$

$n_{i-1} = 0, 1, 2, \ldots, r_{i-1}$ where $1 \leq i \leq m$, and $k_i = 0, 1, 2, \ldots, r_{m-i} - 1$ where $0 \leq i \leq m-1$.

Also, $W = e^{-j\frac{2\pi}{N}}$.

For ease of equation manipulation the following notation changes are made:

$$W^{n_{i-1}k_{m-i}\frac{N}{4}} = e^{-j\frac{2\pi}{N}n_{i-1}k_{m-i}\frac{N}{4}} = e^{-j\frac{\pi}{2}n_{i-1}k_{m-i}} \equiv T(n_{i-1}k_{m-i})$$

and $$W^f = e^{-j2\pi\frac{f}{N}} \equiv S\left(\frac{f}{N}\right),$$

where $f$ is an function.

For this example, $N = 4096 = 4^6 (m = 6)$, and $i = 1, 2, \ldots, 6$.

The following six equations follow directly from the Sande-Tukey algorithm and the substitutions shown above:

$$x_1(n_0, k_4, k_3, k_2, k_1, k_0) = \quad (1)$$

$$\left[\sum_{k_5} x_1(k_5, k_4, k_3, k_2, k_1, k_0) T(n_0 k_5)\right] \times$$

$$S\left(\frac{1}{16} n_0 k_4 + \frac{1}{64} n_0 k_3 + \frac{1}{256} n_0 k_2 + \frac{1}{1024} n_0 k_1 + \frac{1}{4096} n_0 k_0\right),$$

$$x_2(n_0, n_1, k_3, k_2, k_1, k_0) = \quad (2)$$

$$\left[\sum_{k_4} x_1(n_0, k_4, k_3, k_2, k_1, k_0) T(n_1 k_4)\right] \times$$

$$S\left(\frac{1}{16} n_1 k_3 + \frac{1}{64} n_1 k_2 + \frac{1}{256} n_1 k_1 + \frac{1}{1024} n_1 k_0\right),$$

$$x_3(n_0, n_1, n_2, k_2, k_1, k_0) = \quad (3)$$

$$\left[\sum_{k_3} x_2(n_0, n_1, k_3, k_2, k_1, k_0) T(n_2 k_3)\right] \times$$

$$S\left(\frac{1}{16} n_2 k_2 + \frac{1}{64} n_2 k_1 + \frac{1}{256} n_2 k_0\right),$$

$$x_4(n_0, n_1, n_2, n_3, k_1, k_0) = \quad (4)$$

$$\left[\sum_{k_2} x_3(n_0, n_1, n_2, k_2, k_1, k_0) T(n_3 k_2)\right] S\left(\frac{1}{16} n_3 k_1 + \frac{1}{64} n_3 k_0\right),$$

$$x_5(n_0, n_1, n_2, n_3, n_4, k_0) = \quad (5)$$

$$\left[\sum_{k_1} x_4(n_0, n_1, n_2, n_3, k_1, k_0) T(n_4 k_1)\right] S\left(\frac{1}{16} n_4 k_0\right), \text{ and}$$

$$x_6(n_0, n_1, n_2, n_3, n_4, n_5) = \quad (6)$$

$$\left[\sum_{k_0} x_5(n_0, n_1, n_2, n_3, n_4, k_0) T(n_5 k_0)\right] S(0),$$

where $S(0) = 1$.

The following substitutions are used for further amplification:

$x_0 \equiv x_0(k_5, k_4, k_3, k_2, k_1, k_0),$ $x_1 \equiv x_1(n_0, k_4, k_3, k_2, k_1, k_0),$ $x_2 \equiv x_2(n_0, n_1, k_3, k_2, k_1, k_0),$ $x_3 \equiv x_3(n_0, n_1, n_2, k_2, k_1, k_0),$ $x_4 \equiv x_4(n_0, n_1, n_2, n_3, k_1, k_0)$ $x_5 \equiv x_5(n_0, n_1, n_2, n_3, n_4, k_0),$ $x_6 \equiv x_6(n_0, n_1, n_2, n_3, n_4, n_5),$ $T_1 \equiv T(n_0 k_5),$ $T_2 \equiv T(n_1 k_4),$ $T_3 \equiv T(n_2 k_3),$ $T_4 \equiv T(n_3 k_2),$ $T_5 \equiv T(n_4 k_1),$ and $T_6 \equiv T(n_5 k_0).$ Using all of the above substitutions, the original six stage equations simplify to the following:

$$x_1 = \left[\sum_{k_5} x_0 T_1\right] S\left(\frac{1}{16} n_0 k_4 + \frac{1}{64} n_0 k_3 + \frac{1}{256} n_0 k_2 + \frac{1}{1024} n_0 k_1 + \frac{1}{4096} n_0 k_0\right), \quad (1)$$

$$x_2 = \left[\sum_{k_4} x_1 T_2\right] S\left(\frac{1}{16} n_1 k_3 + \frac{1}{64} n_1 k_2 + \frac{1}{256} n_1 k_1 + \frac{1}{1024} n_1 k_0\right), \quad (2)$$

$$x_3 = \left[\sum_{k_3} x_2 T_3\right] S\left(\frac{1}{16} n_2 k_2 + \frac{1}{64} n_2 k_1 + \frac{1}{256} n_2 k_0\right), \quad (3)$$

$$x_4 = \left[\sum_{k_2} x_3 T_4\right] S\left(\frac{1}{16} n_3 k_1 + \frac{1}{64} n_3 k_0\right), \quad (4)$$

$$x_5 = \left[\sum_{k_1} x_4 T_5\right] S\left(\frac{1}{16} n_4 k_0\right), \text{ and} \quad (5)$$

$$x_6 = \left[ \sum_{k_0} x_5 T_6 \right].$$

The equations have been stripped of unneccesary information, leaving only the relevant detail of the coefficient terms. The equations in this form are easily read and can be used for comparison with the final results, as the method of FFT calculation will not change but the coefficients and the number of coefficients will change. For the mathematics following, the coefficients will be simplified also. The coefficient terms are defined here:

$$S_1 = S\left( \frac{1}{16} n_0 k_4 + \frac{1}{64} n_0 k_3 + \frac{1}{256} n_0 k_2 + \frac{1}{1024} n_0 k_1 + \frac{1}{4096} n_0 k_0 \right),$$

$$S_2 = S\left( \frac{1}{16} n_1 k_3 + \frac{1}{64} n_1 k_2 + \frac{1}{256} n_1 k_1 + \frac{1}{1024} n_1 k_0 \right),$$

$$S_3 = S\left( \frac{1}{16} n_2 k_2 + \frac{1}{64} n_2 k_1 + \frac{1}{256} n_2 k_0 \right),$$

$$S_4 = S\left( \frac{1}{16} n_3 k_1 + \frac{1}{64} n_3 k_0 \right), \text{ and}$$

$$S_5 = S\left( \frac{1}{16} n_4 k_0 \right).$$

Using these final substitutions, the original six stage equations simplify to the following:

$$x_1 = \left[ \sum_{k_5} x_0 T_1 \right] S_1, \quad (1)$$

$$x_2 = \left[ \sum_{k_4} x_1 T_2 \right] S_2, \quad (2)$$

$$x_3 = \left[ \sum_{k_3} x_2 T_3 \right] S_3, \quad (3)$$

$$x_4 = \left[ \sum_{k_2} x_3 T_4 \right] S_4, \quad (4)$$

$$x_5 = \left[ \sum_{k_1} x_4 T_5 \right] S_5, \text{ and} \quad (5)$$

$$x_6 = \left[ \sum_{k_0} x_5 T_6 \right]. \quad (6)$$

The coefficient term $S_1$, in equation (1), is defined here:

$$S_1 = S_1' S_1'' S_1'''$$

where $$S_1' = S\left( \frac{1}{16} n_0 k_4 + \frac{1}{64} n_0 k_3 + \frac{1}{256} n_0 k_2 \right),$$

$$S_1'' = S\left( \frac{1}{1024} n_0 k_1 \right), \text{ and}$$

$$S_1''' = S\left( \frac{1}{4096} n_0 k_0 \right).$$

$S_2$, in equation (2), is defined here:

$$S_2 = S_2' S_2''$$

where $$S_2' = S\left( \frac{1}{16} n_1 k_3 + \frac{1}{64} n_1 k_2 + \frac{1}{256} n_1 k_1 \right) \text{ and}$$

$$S_2'' = S\left( \frac{1}{1024} n_1 k_0 \right).$$

Now that the basic stage equations have been simplified, the demonstration becomes a series of mathematical manipulations. Beginning with stage equation (5) and multiplying both the numerator and the denominator by $S_2'' S_1'''$, the equation becomes:

$$x_5 = \left[ \sum_{k_1} x_4 T_5 \right] \frac{S_5 S_2'' S_1'''}{S_2'' S_1'''}.$$

The coefficient term can be modified by rearranging the equation such that particular coefficient terms (S terms) are brought within the summation brackets and others are purposely left outside of the brackets. Any term can be placed within or removed from the summation if the term is not a function of the summation index. So, $$x_5 = \left[ \sum_{k_1} x_4 \left( \frac{1}{S_2'' S_1'''} \right) T_5 \right] S_5 S_2'' S_1'''.$$

The new *balanced* coefficients for the fifth stage are $S_5 S_2'' S_1'''$. Now, $x_5$ is rewritten:

$$x_5 = \left[ \sum_{k_1} x_4' T_5 \right] S_5 S_2'' S_1''', \text{ where} \quad (5b)$$

$$x_4' = x_4 \left( \frac{1}{S_2'' S_1'''} \right). \quad (5c)$$

Continuing in the same manner, the new balanced coefficients can be derived for all other stages. To calculate stage four coefficients, $x_4$, from equation (4), is substituted into equation (5c):

$$x_4' = \left[\sum_{k_2} x_3 T_4\right](S_4)\left(\frac{1}{S_2''S_1'''}\right)\left(\frac{S_1''}{S_1'''}\right)$$

$$= \left[\sum_{k_2} x_3 \left(\frac{1}{S_2''S_1''S_1'''}\right)T_4\right]S_4 S_1''.$$

The *balanced* coefficients for stage four are $S_4 S_1''$. For stage three, $x_4'$ is rewritten:

$$x_4' = \left[\sum_{k_2} x_3' T_4\right]S_4 S_1'', \text{ where} \tag{4b}$$

$$x_3' = x_3\left(\frac{1}{S_2''S_1''S_1'''}\right)$$

$$= \left[\sum_{k_3} x_2 T_3\right](S_3)\left(\frac{1}{S_2''S_1''S_1'''}\right)$$

$$= \left[\sum_{k_3} x_2\left(\frac{1}{S_2''S_1''S_1'''}\right)T_3\right]S_3.$$

The *balanced* coefficients for stage three are $S_3$. For stage two, $x_3'$ is rewritten:

$$x_3' = \left[\sum_{k_3} x_2' T_3\right]S_3, \text{ where} \tag{3b}$$

$$x_2' = x_2\left(\frac{1}{S_2''S_1''S_1'''}\right)$$

$$= \left[\sum_{k_4} x_1 T_2\right](S_2)\left(\frac{1}{S_2''S_1''S_1'''}\right)$$

$$= \left[\sum_{k_4} x_1\left(\frac{1}{S_1''S_1'''}\right)T_2\right]\left(\frac{S_2}{S_2''}\right).$$

The *balanced* coefficients for stage two are $$\frac{S_2}{S_2''}.$$

For stage one, $x_2'$ is rewritten:

$$x_2' = \left[\sum_{k_4} x_1' T_2\right]\left(\frac{S_2}{S_2''}\right), \text{ where} \tag{2b}$$

-continued $$x_1' = x_1\left(\frac{1}{S_1''S_1'''}\right) \tag{1b}$$

$$= \left[\sum_{k_5} x_0 T_1\right]\left(\frac{S_1}{S_1''S_1'''}\right)$$

The balanced coefficients for stage one are $$\frac{S_1}{S_1''S_1'''}.$$

Using the definitions of $S_1$, $S_1''$, and $S_1'''$:

$$\frac{S_1}{S_1''S_1'''} = \frac{S\left(\frac{1}{16}n_0k_4 + \frac{1}{64}n_0k_3 + \frac{1}{256}n_0k_2 + \frac{1}{1024}n_0k_1 + \frac{1}{4096}n_0k_0\right)}{S\left(\frac{1}{1024}n_0k_1\right)S\left(\frac{1}{4096}n_0k_0\right)}$$

$$\equiv S\left(\frac{1}{16}n_0k_4 + \frac{1}{64}n_0k_3 + \frac{1}{256}n_0k_2\right).$$

The other *balanced* coefficents for each stage follow from similar arithmetic:

$$\frac{S_2}{S_2''} = S\left(\frac{1}{16}n_1k_3 + \frac{1}{64}n_1k_2 + \frac{1}{256}n_1k_1\right),$$

$$S_3 = S\left(\frac{1}{16}n_2k_2 + \frac{1}{64}n_2k_1 + \frac{1}{256}n_2k_0\right),$$

$$S_4 S_1'' = S\left(\frac{1}{16}n_3k_1 + \frac{1}{64}n_3k_0 + \frac{1}{1024}n_0k_1\right), \text{ and}$$

$$S_5 S_1''' S_2'' = S\left(\frac{1}{16}n_4k_0 + \frac{1}{1024}n_1k_0 + \frac{1}{4096}n_0k_0\right).$$

Substituting these results back into the FFT equations gives us our final results:

$$x_1' = \left[\sum_{k_5} x_0 T_1\right]S\left(\frac{1}{16}n_0k_4 + \frac{1}{64}n_0k_3 + \frac{1}{256}n_0k_2\right), \tag{1b}$$

$$x_2' = \left[\sum_{k_4} x_1' T_2\right]S\left(\frac{1}{16}n_1k_3 + \frac{1}{64}n_1k_2 + \frac{1}{256}n_1k_1\right), \tag{2b}$$

$$x_3' = \left[\sum_{k_3} x_2' T_3\right]S\left(\frac{1}{16}n_2k_2 + \frac{1}{64}n_2k_1 + \frac{1}{256}n_2k_0\right), \tag{3b}$$

$$x_4' = \left[\sum_{k_2} x_3' T_4\right]S\left(\frac{1}{16}n_3k_1 + \frac{1}{64}n_3k_0 + \frac{1}{1024}n_0k_1\right), \tag{4b}$$

$$x_5 = \left[\sum_{k_1} x_4' T_5\right]S\left(\frac{1}{16}n_4k_0 + \frac{1}{1024}n_1k_0 + \frac{1}{4096}n_0k_0\right), \tag{5b}$$

-continued and $$x_6 = \left[ \sum_{k_0} x_5 T_6 \right]. \quad (6b)$$

Each stage of a *balanced* 4096 point FFT can be performed with 256 ($4^4$) unique coefficients. Also, stages one, two, and three require identical coefficients. Thus, a radix-4, 4096 point FFT can be performed using only 768 coefficients, as opposed to 4096.

FIG. 1A shows in block diagram, the basic FFT signal processing apparatus 10 using Sande-Tukey coefficients. Address counter 12 is input as a clock to a coefficient buffer 14 and to the data buffer 16, both the coefficient buffer which stores the 4K coefficient and the data buffer are fed into the FFT engine 18. Digital data is input into the data buffer 16 through port 11 and used to generate the coefficients for the FFT equation. The output of FFT engine 18 is fed back through loop 17 as a recursive input to the data buffer. Upon completion of the coefficient generation, the output from FFT engine 18 is taken at port 19. The results from the engine are the coefficients X1 from the Cooley-Tukey equation which are fed back into the data buffer and reprocessed to come up with X2 which are reprocessed to come up with X3, etc. until all the coefficients including X6 are determined. These coefficients are then run through the Cooley-Tukey algorithm to produce a fast Fourier transform of time domain signal data.

Listed in FIG. 1B are the stages which correspond to the six equations needed for a 4K FFT using the Cooley-Tukey algorithm. The counter on the first pass uses the lower order 12 bits and runs through zero to 4K to produce the X1 coefficients. In stage 2, the lower 10 bits are used, running from zero to 1K which is done four times to produce the X2 coefficients. In stage 3, the lower eight bits are used which run from zero to 256 to produce the X3 coefficients upon running 16 times. Likewise, in stage 4, the counter goes from zero to 64 and in stage 5, from zero to 16 and in stage 6, from zero to four for the last coefficient X6.

Figures 2A, 2B:
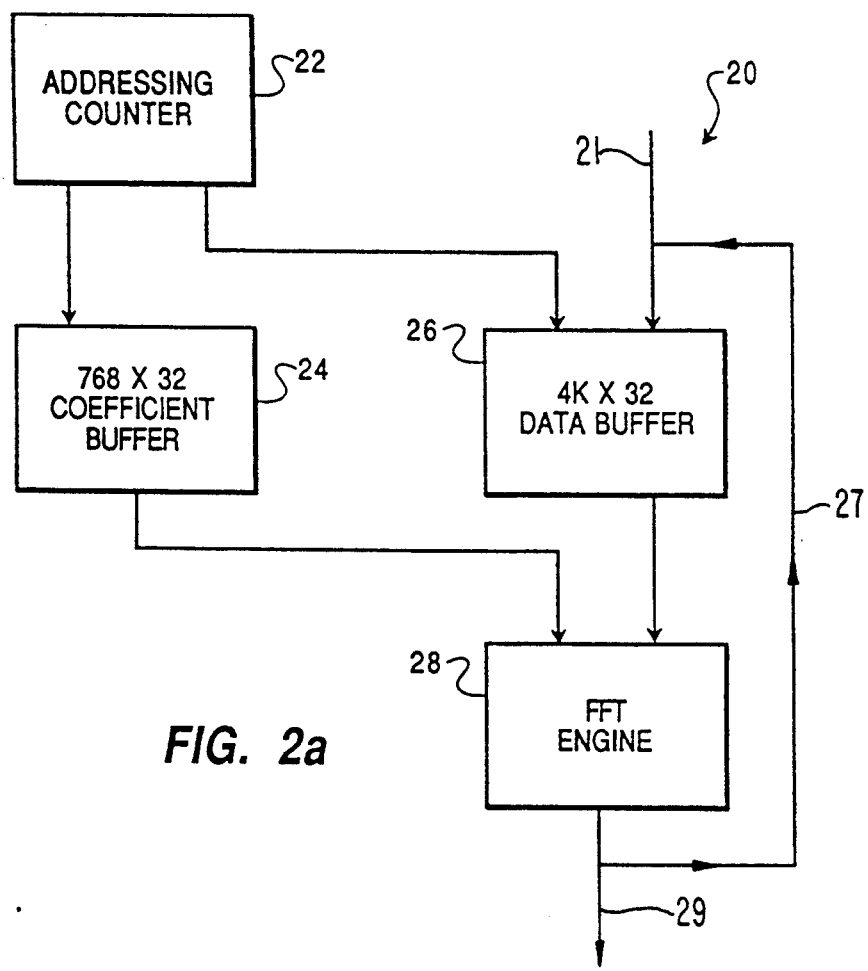
FIG. 2A shows in block form, an apparatus for performing a 4096 point FFT using balanced coefficients.
FIG. 2B is the coefficient addressing scheme used in the FFT processor of FIG. 2A.

A 4K point FFT of recursive design using balanced coefficients 20 is shown in FIG. 2A. Addressing counter 22 feeds into a coefficient buffer 24 and into a 4K data buffer 26. Coefficient buffer 24 is a PROM holding the 768 coefficients for the FFT. Coefficients are called into the FFT engine 28 from coefficient buffer 24 and data buffer 26 for each stage. Digital signal input 21 is feed into the data buffer 26. The output from the FFT engine 28 is feed back through loop 27 to form a recursive input to the data buffer for the calculation of the FFT coefficients. When all the FFT coefficients have been generated, the output from FFT engine 28 is taken at port 29. As can be seen in FIG. 2B, the outer addressing scheme uses the lowest eight bits for stages 1, 2 and 3 to satisfy the equations for X1', X2' and X3'. For stage 4, the counter runs from 256 through 511 and in stage 5, from 512 to 768. For stage 6, $S_0$ is set equal to 1+0J.

The invention reduces the number of coefficients for a $2^p$ FFT from a total of $2^p$ coefficients to approximately p times the square root of $2^p$. The actual formula to determine the number of coefficients for a radix 4 FFT is N=FFT size; N=$4^n$; if n is even, the number of balanced coefficients is equal to $(n/2) 4^{n/2+1}$; if n is odd, the number of coefficients is $4^{n/2+3/2}+(n/2-3/2)$ $4^{n/2+\frac{1}{2}}$. This produces the following:

| FFT Size | Coefficients Required | |
|----------|---------|---------|
|          | Old Way | New Way |
| 256      | 256     | 128     |
| 1K       | 1K      | 328     |
| 4K       | 4K      | 768     |
| 16K      | 16K     | 1536    |
| 64K      | 64K     | 4K      |

FIG. 3 shows a generalized version of the balanced coefficients required for a 256 to 64K point fast Fourier transform. The new concept of employing balanced coefficients reduces the coefficient storage by a factor of 2 for a 256 point FFT, by a factor of 5 for a 4K point FFT and by a factor of 16 for a 64K FFT. This allows an FFT signal processor to be cheaper, lower in power, lighter, smaller, cooler and more reliable.

Although a specific embodiment of the invention has been disclosed, it will be understood by those having skill in the art that changes can be made in that specific embodiment without departing from the spirit and the scope of the invention.

What is claimed is:

1. A method of generating a sequence of signals which represent balanced coefficients wherein each balanced coefficient is a combination of the same number of balanced coefficient values for a Fourier transform for use in a Fast Fourier Transform processor in processing a sequence of N=2**P real-value input signals comprising the steps of:

storing said sequence of input signals in a data buffer;

generating a set of balanced coefficient values wherein the number of balanced coefficients is substantially equal to P times the square root of 2**P;

selectively combining in the Fast Fourier Transform processor said stored signals and said balanced coefficient values, thereby to form an intermediate sequence of Fourier transform signals;

storing said intermediate Fourier signals in said data buffer in place of said sequence of signals previously stored in said data buffer; and iteratively performing steps of combining the balanced coefficient values with the signals stored in the data buffer and storing the resultant intermediate Fourier transform frequency domain signals in the data buffer to be used as operands for the next iteration of Fourier signals until completion of a Fourier series of coefficients for the input sequence of N real-value input signals whereby the storage capacity for the Fast Fourier Transform processor is reduced by using the balanced coefficients in transforming the input signal from a time domain to a frequency domain.

2. The method of claim 1 wherein the generated ordered set of balanced coefficients contains substantially P times the square root of 2**P values.

3. The method of claim 1 wherein the selective combining of said generated set of balanced coefficient values with the stored signals is performed first on a lower ordered portion of the set of generated balanced coefficient values.

4. An apparatus for generating a sequence of signals which represent balanced coefficients wherein each balanced coefficient is a combination of the same number of respective coefficient values for a Fourier transform for use in a Fast Fourier Transform processor in processing an input sequence of N=2**P real-value signals comprising:

means for storing said input sequence of signals in a data buffer;

means for generating a set of balanced coefficient values wherein the number of balanced coefficients is substantially equal to 2**P;

the Fast Fourier Transform processor selectively combining said stored signals and said balanced coefficient values, to thereby form an intermediate sequence of Fourier transform signals;

data buffer means for storing said intermediate Fourier transform signals in place of said sequence of signals previously stored in said data buffer means; and means for iteratively performing the combining of the balanced coefficient values with the signals stored in the data buffer means and storing the resultant intermediate Fourier transform signals in the data buffer means to be used as operands for the next iteration of Fourier transformations until completion of a Fourier series of coefficients for the input sequence of N real-value signals whereby the storage capacity for the Fast Fourier Transform processor is reduced by using the balanced coefficients in transforming the input signal from a time domain to a frequency domain.

5. The apparatus of claim 1 wherein the balanced coefficients are complex-values.

6. The apparatus of claim 4 wherein the processor means first uses a lower ordered portion of the generated set of balanced coefficient values.

7. A system for transforming a sequence of N=2**P input signals from a time domain to a Fourier series of values representing the signals in the frequency domain using balanced coefficients wherein each balanced coefficient is a combination of the same number of respective coefficient values for a Fourier transform for use in a Fast Fourier Transform processor, comprising:

means for storing said input sequence of signals in a data buffer;

means for generating a set of balanced coefficient values wherein the number of balanced coefficients is substantially equal to 2**P;

memory means for storing the generated balanced coefficients;

the Fast Fourier Transform processor selectively combining said stored signals and said set of balanced coefficients, to thereby form an intermediate sequence of Fourier Transform signals;

data buffer means for storing said intermediate Fourier Transform signals in place of said sequence of signals previously stored in said data buffer mean; and means for iteratively performing the combining of the balanced coefficients with the signals stored in the data buffer means and storing the resultant intermediate Fourier Transform signals in the data buffer means to be used as operands for the next iteration of Fourier transformations until completion of a Fourier series of coefficients for the input sequence of signals whereby the storage capacity for the Fast Fourier Transform processor is reduced by using the balanced coefficients in transforming the input signal from a time domain to a frequency domain.

* * * * *